Jan. 26, 1932.   U. A. WHITAKER   1,842,486
GRADUATED RELEASE VALVE
Filed Oct. 17, 1929
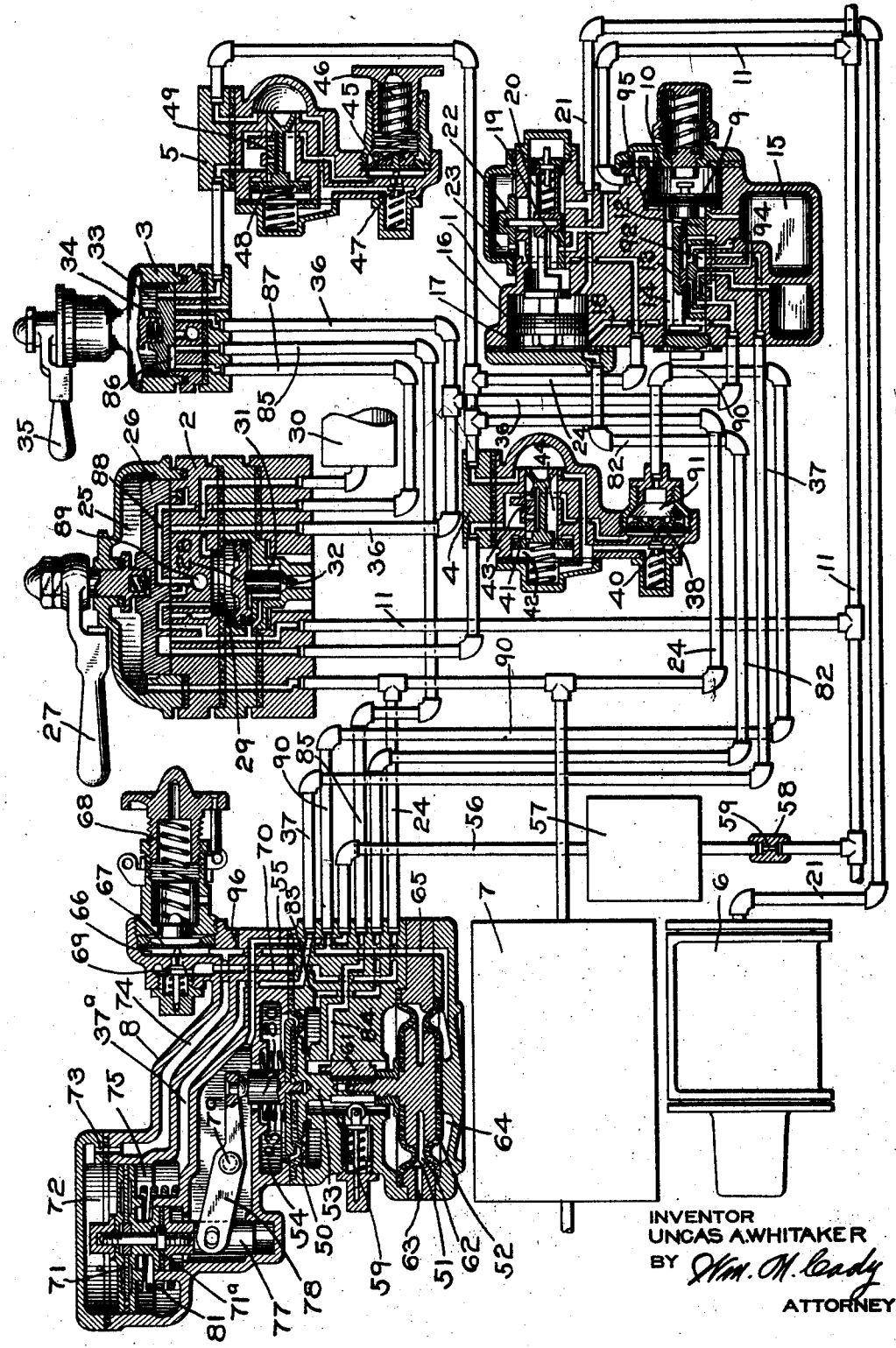
INVENTOR
UNCAS A. WHITAKER
BY Wm. M. Cady
ATTORNEY Patented Jan. 26, 1932

1,842,486

UNITED STATES PATENT OFFICE

UNCAS A. WHITAKER, OF CANTON, OHIO, ASSIGNOR TO THE WESTINGHOUSE AIR BRAKE COMPANY, OF WILMERDING, PENNSYLVANIA, A CORPORATION OF PENNSYLVANIA

GRADUATED RELEASE VALVE

Application filed October 17, 1929. Serial No. 400,204.

This invention relates to full pressure brakes, and more particularly to a fluid pressure locomotive brake equipment.

The fluid pressure brake equipment usually employed on railway cars is provided with means for effecting a graduated release of the brakes, and with this equipment, it has been found that after a full service application of the brakes, the brake cylinder pressure may be graduated off until the brake pipe pressure has been increased to within approximately ten pounds of the normal standard pressure carried in the brake pipe, at which point the brakes will completely and fully release.

On the locomotive, however, the brakes are released independently, and may be completely released before, or continue to release after the train brakes are fully released.

The principal object of my invention is to provide a locomotive brake equipment having means for graduating the release of the brakes in synchronism with the graduated release of the train brakes.

In the accompanying drawing, the single figure is a diagrammatic view, with the principal parts in section, of a locomotive brake equipment embodying my invention.

The locomotive brake equipment may be of the well known ET locomotive brake type comprising a distributing valve device 1, an automatic brake valve device 2, an independent brake valve device 3, a feed valve device 4, a reducing valve device 5, a brake cylinder 6, representing the several brake cylinders on the locomotive, and a main reservoir 7. In addition to the above usual equipment, a release controlling valve device 8 is provided, in accordance with my invention.

The distributing valve device 1 may be of the usual construction comprising an equalizing portion and an application and release portion. The equalizing portion comprises a piston 9 contained in piston chamber 10, which is connected to the brake pipe 11 and a main slide valve 12 and a graduating slide valve 13, contained in valve chamber 14, which is connected to a pressure chamber 15, the valves 12 and 13 being operated by piston 9.

The application and release portion comprises a piston 16, contained in application cylinder 17, which is connected to a passage 18, leading to the seat of slide valve 12, a release slide valve 19, contained in valve chamber 20, which is connected to pipe 21, leading to the brake cylinder 6, and an application supply valve 22, contained in valve chamber 23, which is connected to a main reservoir supply pipe 24, said valves being operated by piston 16.

The automatic brake valve device 2 comprises a casing having a valve chamber 25, connected to the main reservoir supply pipe 24, and containing a rotary slide valve 26, adapted to be operated by a handle 27.

The brake valve device also includes the usual equalizing discharge valve device, comprising an equalizing piston 28, having the chamber 29 at one side connected to an equalizing reservoir 30, and the chamber 31 at the opposite side connected to the brake pipe 11. Piston 28 is adapted to operate a discharge valve 32 for venting fluid under pressure from the brake pipe to the atmosphere.

The independent brake valve device 3 comprises a casing having a valve chamber 33, containing a rotary slide valve 34, adapted to be operated by a handle 35.

An application cylinder pipe 36 leads from passage 18 in the distributing valve device, and has branches, leading to the seats of the rotary valves 26 and 34. A pipe 37 leads to the seat of slide valve 12 and is connected to the release controlling valve device 8, according to my invention.

The feed valve device 4 comprises a regulating portion and a supply portion. The regulating portion comprises a diaphragm 38 subject on one side to brake pipe pressure, when the automatic brake valve 2 is in running position, and for the purpose of the present insertion, the opposite side of the diaphragm is subject to fluid pressure as supplied from a regulating portion associated with the release controlling valve device 8, instead of to the pressure of the usual regulating spring.

The diaphragm 38 is adapted to operate a valve 40 for controlling the operation of the supply portion. The supply portion comprises a piston 41, contained in piston chamber 42, the pressure in which is controlled by the valve 40, and a slide valve 43, contained in valve chamber 44 and adapted to be operated by piston 41.

The reducing valve device 5 comprises a diaphragm 45, a regulating spring 46, a regulating valve 47, a supply piston 48, and a supply valve 49, adapted to be operated by piston 48.

The release controlling valve device 8 comprises casing sections, between which are mounted flexible diaphragms 50, 51, and 52. The diaphragms are rigidly connected together by a stem 53 and chamber 54 at the outer face of diaphragm 50 is connected to a passage 55, which in turn is connected through a pipe 56 with the brake pipe 11. Interposed in pipe 56 is a volume reservoir 57 and a choke plug 58 having a restricted flow port 60. The valve chamber 59, intermediate the diaphragms 50 and 51, contains a slide valve 61 adapted to be operated by the movement of the stem 53. The chamber 62 intermediate the diaphragms 51 and 52 is open to the atmosphere through passage 63, and chamber 64 at the outer face of diaphragm 52 is connected, through a passage 65 with a chamber 66 at one side of a diaphragm 67 of a feed valve regulating portion. The diaphragm 67 is subject on one side to the pressure of an adjustable regulating spring 68, and said diaphragm is adapted to operate a valve 69 for controlling the supply of fluid under pressure from a passage 70 connected to the main reservoir pipe 24, to diaphragm chamber 66.

The valve device 8 also includes a piston 71 having the chamber 72 at one side connected through a passage 73 and a passage 74 with diaphragm chamber 66. Rigidly connected to piston 71 is a piston 71ª of smaller area and chamber 75 at one side of piston 71 is connected through a passage 37ª with pipe 37.

The pistons 71 and 71ª have a depending stem 77 to one end of which a lever 78 is pivotally connected. Said lever is pivotally mounted on a pin 79 and the other end of the lever is adapted to engage a stem 80 carried by the diaphragm 50. The outer face of piston 71ª is subject to brake pipe pressure as supplied through passage 55. The piston 71 is subject to the pressure of a coil spring 81, which opposes the fluid pressure in chamber 72.

A pipe 82, connected directly to the application cylinder 17, communicates with a passage 83, which opens into valve chamber 59, and a passage 84, leading to the seat of slide valve 61, is connected to a pipe 85. The pipe 85 is connected, in the running position of the independent rotary valve 34, through a cavity 86, with a pipe 87, which pipe is connected, in the running position of the automatic rotary valve 26, through a cavity 88, with an exhaust port 89.

Passage 65 and diaphragm chamber 66 are connected to pipe 90, which leads to chamber 91, of the feed valve device 4.

In operation, the usual parts of the locomotive brake equipment are charged with fluid under pressure in the usual manner, the feed valve device 4 operating to maintain the pressure in the brake pipe in the usual manner, except that the regulating diaphragm 38 is controlled by fluid under pressure supplied to chamber 91 by operation of the regulating portion associated with the release controlling valve device and including the valve 69 and the diaphragm 67.

In addition, the chamber 75 of the release controlling valve device 8 is charged with fluid under pressure supplied from the pressure chamber 15, when the slide valve 12 is in release position, through cavity 92 and pipe 37.

The pressure in chamber 72 is maintained at the standard pressure carried in the brake pipe by operation of the regulating valve 69 and diaphragm 67, and the same constant pressure is maintained in diaphragm chamber 64.

Brake pipe pressure acts in the chamber below the piston 71ª, and the fluid pressures being normally equalized on opposite sides of the pistons 71 and 71ª, the spring 81 acts to urge the pistons upwardly and to exert pressure through the lever 78 on the stem 80. The brake pipe pressure in chamber 54 is substantially equal to the pressure in chamber 64, and consequently the pressure of spring 81 acting through lever 78 plus the pressure of spring 93, act to depress the diaphragms 50, 51 and 52 to the position shown in the drawing, in which slide valve 61 uncovers passage 84 to the valve chamber 59.

The application cylinder 17 of the distributing valve device 1 is then connected to the atmosphere by way of pipe 82, passage 83, valve chamber 59, passage 84, pipe 85, cavity 86 in the independent rotary valve 34, pipe 87, cavity 88 in the automatic rotary valve 26, and exhaust port 89.

In effecting a service application of the brakes, the equalizing piston 9 of the distributing valve device moves to service position, in which the pressure chamber 15 is connected in the usual manner with the application cylinder 17 and the application portion of the distributing valve device is then operated in the usual manner to supply fluid under pressure to the brake cylinder 6.

In service position of the slide valve 12, pipe 37 is connected through cavity 92 with an exhaust port 94, so that fluid under pressure in chamber 75 is vented to the atmosphere. The constantly maintained pressure in chamber 72 then overcomes the reduced brake pipe pressure acting on the lower face of piston 71ª and the pressure of spring 81, so that the piston 71 is moved downwardly, relieving the stem 80 of the pressure acting thereon through lever 78.

The constant fluid pressure in chamber 64 then overcomes the reduced brake pipe pressure in chamber 54 and the pressure of the light spring 93 and the diaphragms 50, 51 and 52 are moved upwardly, causing the slide valve 61 to blank the passage 84.

The valve chamber 59 being connected to the application cylinder 17, through pipe 82, the fluid pressure in said valve chamber builds up with the pressure of fluid supplied to the application cylinder 17, in effecting a service application of the brakes.

In effecting the release of the brakes, the equalizing piston 9 of the distributing valve device 1, moves to release position, in which the pressure chamber 15 is charged from the brake pipe 11, through the usual feed groove 95 around the equalizing piston 9 and the pressure chamber 15 being again connected to pipe 37, through cavity 92, the fluid pressure in chamber 75 is built up.

The lower face of piston 71ª being also subject to brake pipe pressure, the device acts in releasing the brakes the same as if only the piston 71 were present and subject to the constant fluid pressure in chamber 72, opposed by the brake pipe pressure and the pressure of spring 81 and the pressure of spring 81 is such that when the brake pipe pressure has been increased to within a predetermined degree of the normal pressure carried in the brake pipe, such as to within 10 pounds, for example, the brake pipe pressure plus the pressure of spring 81 will overcome the constant pressure acting in chamber 72 and the device will operate to apply pressure through the lever 78 to the stem 80.

When the brake pipe pressure is increased in releasing the brakes, the increased brake pipe pressure acts in chamber 54 in the same direction as the fluid pressure in valve chamber 59, acting on the larger differential area of the diaphragm 51 as compared with the area of the diaphragm 50 and overcomes the constant fluid pressure in chamber 64, so that the diaphragms 50, 51 and 52 are shifted downwardly to the position shown in the drawing, in which the slide valve 61 uncovers the passage 84 and permits the venting of fluid under pressure from the application cylinder 17 to the exhaust port 89, as hereinbefore described.

When the pressure in valve chamber 59 and the application cylinder 17 has been thus reduced to a degree sufficient to permit the constant pressure in chamber 64 to overcome the opposing pressures of the brake pipe and the pressure in chamber 59, the diaphragms 50, 51 and 52 will be moved upwardly, causing the slide valve 61 to lap the passage 84 and thus cut off the further venting of fluid from the application cylinder.

Further increases in brake pipe pressure to graduate the release of the brakes on the train cause the releases controlling valve device to operate in the same manner as above described to vent additional fluid from the application cylinder, so as to cause the operation of the application and release portion of the distributing valve device to release a corresponding amount of fluid under pressure from the brake cylinder 6.

When the pressure in the brake pipe has been increased to within a predetermined degree of the normal pressure carried in the brake pipe, the piston 71 acts to apply pressure through the lever 78 to the stem 80, so that the diaphragms are now maintained in release position, permitting the fluid remaining in the application cylinder to be vented to the atmosphere.

Should fluid under pressure leak into the application cylinder 17, while the parts are in release position, as by the creeping of the equalizing slide valve 12 from release position, fluid thus leaking into the application cylinder 17 will be vented through pipe 82 to the atmosphere, thus preventing the movement of piston 16 tending to apply the brakes, by leakage of fluid into the application cylinder.

In order to prevent the possible build up of pressure in the chamber 64 above the setting of the regulating valve device, as may occur, due to a leaky regulating valve, a restricted exhaust port 96 may be provided, which connects passage 65 with atmosphere.

While one illustrative embodiment of the invention has been described in detail, it is not my intention to limit its scope to that embodiment or otherwise than by the terms of the appended claims.

Having now described my invenion, what I claim as new and desire to secure by Letters Patent, is:

1. In a fluid pressure brake, the combination with a brake pipe, a brake cylinder, an application and release valve device operated by variations in pressure in an application cylinder for controlling the admission and release of fluid under pressure to and from the brake cylinder, and an equalizing valve device operated by variations in brake pipe pressure for controlling the pressure in said application cylinder, of a pipe connected directly to said aplication cylinder and an auxiliary valve device operated by an increase in brake pipe pressure for releasing fluid from said application cylinder through said pipe.

2. In a fluid pressure brake, the combination with a brake pipe, a brake cylinder, an application and release valve device operated by variations in pressure in an application cylinder for controlling the admission and release of fluid under pressure to and from the brake cylinder, and an equalizing valve device operated by variations in brake pipe pressure for controlling the pressure in said application cylinder, of a pipe connected to said application cylinder and independent of said equalizing valve device and an auxiliary valve device operated by an increase in brake pipe pressure for releasing fluid from said application cylinder through said pipe.

3. In a locomotive brake apparatus, the combination with a brake pipe, brake cylinder, a valve device operated by a reduction in pressure in an application cylinder for releasing fluid under pressure from the brake cylinder, a valve device operated by variations in brake pipe pressure for controlling the pressure in said application cylinder, and an automatic brake valve device, of an auxiliary release valve device for controlling the release of fluid from said application cylinder, the release of fluid being from the application cylinder by way of the release valve and thence to an exhaust port by way of said automatic brake valve device.

4. In a locomotive brake apparatus, the combination with a brake pipe, brake cylinder, a valve device operated by a reduction in pressure in application cylinder for releasing fluid under pressure from the brake cylinder, a valve device operated by variations in brake pipe pressure for controlling the pressure in said application cylinder, and an automatic brake valve device and an independent brake valve device, of an auxiliary release valve device for controlling the release of fluid from said application cylinder, the release of fluid being from the application cylinder to said release valve device, thence through said independent brake valve device, and then through said automatic brake valve device to the atmosphere.

5. In a locomotive brake equipment, the combination with a brake pipe, a brake cylinder, and a valve device subject to the opposing pressures of the brake pipe and a pressure chamber for controlling the application and release of the brakes, of a release valve device for also controlling the release of the brakes and means subject to the opposing pressures of the pressure chamber and a constant pressure for controlling the operation of said release valve device.

6. In a locomotive brake equipment, the combination with a brake pipe and an equalizing valve device subject to the opposing pressures of the brake pipe and a pressure chamber for controlling the application and release of the brakes, of a release valve device for also controlling the release of the brakes and means subject in one direction to a constant pressure for assisting in the control of the operation of said release valve device, said equalizing valve device being adapted in release position to supply fluid under pressure from the pressure chamber to said means to oppose the constant pressure acting thereon.

7. In a locomotive brake equipment, the combination with a brake pipe and an equalizing valve device subject to the opposing pressures of the brake pipe and a pressure chamber for controlling the application and release of the brakes, of a release valve device for also controlling the release of the brakes and means subject in one direction to a constant pressure for assisting in the control of the operation of said release valve device, said equalizing valve device being adapted in release position to supply fluid under pressure from the pressure chamber to one side of said means to oppose the constant pressure acting on the opposite side and adapted in service application position to vent to the atmosphere, that side of said means which was subjected to pressure from the pressure chamber.

8. In a locomotive brake equipment, the combination with a brake pipe and an equalizing valve device subject to the opposing pressures of the brake pipe and a pressure chamber for controlling the application and release of the brakes, of means for also controlling the release of the brakes including a differential piston device subject to the opposing pressures of a spring and a constant pressure, said equalizing valve device being adapted in release position to supply fluid under pressure from the pressure chamber to the differential area of said piston device.

9. In a locomotive brake equipment, the combination with a brake pipe and an equalizing valve device subject to the opposing pressures of the brake pipe and a pressure chamber for controlling the application and release of the brakes, of means for also controlling the release of the brakes including a differential piston device subject to the opposing pressures of a spring and a constant pressure, said equalizing valve device being adapted in release position to supply fluid under pressure from the pressure chamber to the differential area of said piston device and to release fluid under pressure from said differential area in brake application position.

10. In a locomotive brake equipment, the combination with a brake pipe, of a valve device subject to the opposing pressures of the brake pipe and a chamber for controlling the release of the brakes on the locomotive, a valve for supplying fluid under pressure to said chamber, a spring, and a movable abutment subject to the opposing pressures of said spring and said chamber for operating said valve.

11. In a locomotive brake equipment, the combination with a brake pipe, of a valve device subject to the opposing pressures of the brake pipe and a chamber for controlling the release of the brakes on the locomotive, a valve for supplying fluid under pressure to said chamber, a spring, a movable abutment subject to the opposing pressures of said spring and said chamber for operating said valve, and a feed valve device for controlling the supply of fluid under pressure to the brake pipe, said feed valve device having a regulating diaphragm subject to the opposing pressures of the brake pipe and a chamber, which chamber is charged with fluid under pressure by the operation of said valve.

In testimony whereof I have hereunto set my hand, this 11th day of October, 1929.

UNCAS A. WHITAKER.